(12) United States Patent
Katahira

(10) Patent No.: US 7,139,046 B2
(45) Date of Patent: Nov. 21, 2006

(54) LIGHT GUIDE DEVICE, ELECTRO-OPTICAL DEVICE, AND ELECTRONIC APPARATUS

(75) Inventor: Yukiyoshi Katahira, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 10/235,996

(22) Filed: Sep. 5, 2002

(65) Prior Publication Data

US 2003/0063456 A1 Apr. 3, 2003

(30) Foreign Application Priority Data

| Sep. 6, 2001 | (JP) | ............................. 2001-270581 |
| Nov. 14, 2001 | (JP) | ............................. 2001-349104 |
| Jul. 31, 2002 | (JP) | ............................. 2002-223167 |

(51) Int. Cl.
 G02F 1/1333 (2006.01)
 G02F 1/1335 (2006.01)

(52) U.S. Cl. ............................. 349/58; 349/65; 349/67

(58) Field of Classification Search ................. 362/26, 362/31; 349/58–60, 61–67
 See application file for complete search history.

(56) References Cited

U.S. PATENT DOCUMENTS

| 5,956,107 A | * | 9/1999 | Hashimoto et al. ........... 349/64 |
| 5,963,280 A | * | 10/1999 | Okuda et al. ................. 349/65 |
| 6,464,367 B1 | * | 10/2002 | Ito et al. ..................... 362/613 |

FOREIGN PATENT DOCUMENTS

| JP | 09-243988 | * | 9/1997 |
| JP | 09243988 | * | 9/1997 |
| JP | 10-142599 | | 5/1998 |
| JP | 11-007261 | | 1/1999 |
| JP | 2000-214459 | | 8/2000 |
| JP | 2000-340019 | | 12/2000 |
| JP | 2001-021884 | | 1/2001 |
| JP | 2002-244133 | | 8/2002 |

OTHER PUBLICATIONS

Merriam Webster's Collegiate Dictionary, 10TH Ed. at p. 109 (Copyright 1999).*
Communication from Chinese Patent Office regarding counterpart application.
Communication received from Japanese Patent office regarding counterpart application.

* cited by examiner

*Primary Examiner*—Dung T. Nguyen
(74) *Attorney, Agent, or Firm*—Harness, Dickey & Pierce, P.L.C.

(57) ABSTRACT

A light guide plate 122 is shaped like a wedge whose thickness gradually decreases from the left end in the figure to the right end, and a light guide plate 142 is shaped like a wedge whose thickness gradually decreases from the right end in the figure to the left end. Since the wedges of the light guide plates 122 and 142 are arranged in a staggered manner, the thickness of the entire liquid crystal display device 100 can be reduced.

19 Claims, 9 Drawing Sheets

(a)

(b)

(a)

(b)

(a)

(b)

(a)

(b)

LIGHT GUIDE DEVICE, ELECTRO-OPTICAL DEVICE, AND ELECTRONIC APPARATUS

DETAILED DESCRIPTION OF THE INVENTION

1. Technical Field of the Invention

The present invention relates to a light guide device, an electro-optical device, and an electronic apparatus.

2. Discussion

In general, a liquid crystal display device is known which includes a liquid crystal display panel, a light guide plate behind the liquid crystal display panel, and a light source placed beside the light guide plate so as to face an end face of the light guide plate. In this liquid crystal display device, light emitted from the light source enters the light guide plate from the end face, is refracted inside the light guide plate, is applied from the front face of the light guide plate toward the liquid crystal display panel, passes through the liquid crystal display panel, and is finally emitted toward the panel front side (viewing side).

FIG. 12 is a schematic sectional view schematically showing the configuration of a liquid crystal display device 10 as an example of a conventional liquid crystal display device. The liquid crystal display device 10 includes a support member 11 made of synthetic resin or the like, a light guide plate 12 fixedly engaged with the support member 11, a reflective sheet 13 placed behind the light guide plate 12, a frame-shaped light-shielding sheet 14 placed on the front surface (upper surface in the figure) of the light guide plate 12, and a liquid crystal display panel 20 placed on the front side of the light-shielding sheet 14.

The liquid crystal display panel 20 is formed by bonding substrates 21 and 22 made of glass or the like with a sealing material 23, and sealing liquid crystal 24 inside the sealing material 23. Polarizers 25 and 26 are bonded on the outer surfaces of the substrates 21 and 22.

A flexible wiring board 15 is connected to the liquid crystal display panel 20, a light source 16, such as an LED (light-emitting diode), is mounted on the flexible wiring board 15, and various electronic components (not shown), such as a semiconductor chip, are mounted thereon, thereby constituting a driving circuit for driving the liquid crystal display panel 20.

In some recent application fields of the above-described liquid crystal display device, in particular, in portable electronic apparatuses (e.g., portable telephones), a first liquid crystal display screen is placed on the front side of a thin structural section of the device, and a second liquid crystal display screen is placed on the back side of the thin structural section. In such a case, a first liquid crystal display device and a second liquid crystal display device are separately mounted in inner portions of the thin structural section close to the front and back sides, respectively. For example, a structure is adopted in which a circuit board is placed inside the thin structural section, the first liquid crystal display device is mounted on the front surface of the circuit board, and the second liquid crystal display device is mounted on the back surface of the circuit board.

In recent years, there have been increasing demands to reduce the size and thickness of portable electronic apparatuses, and the above liquid crystal display device 10 needs to be decreased in thickness. Therefore, not only the liquid crystal display panel 20, but also the light guide plate 12 has been decreased in thickness. However, since two separate liquid crystal display devices are provided inside the above-described thin structural section having the liquid crystal display screens on the front and rear surfaces, respectively, the portions in which the liquid crystal devices are accommodated must be thick, and it is difficult to make the size and thickness smaller than at present.

By separately assembling two liquid crystal display devices into the thin structural section, manufacturing problems arise, that is, the inner structure is complicated and the assembly operation is difficult.

Accordingly, the present invention overcomes the above problems, and an object of the present invention is to provide a light guide device which can apply light to the front and back sides and whose thickness can be sufficiently decreased. Another object is to provide a new electro-optical device that is applicable to an electronic apparatus having a display screen at the front and back thereof, or to a structural section of the electronic apparatus, and that can further reduce the thickness of the structural section.

SUMMARY OF THE INVENTION

In order to achieve the above objects, a light guide device of the present invention includes a first light guide plate, a second light guide plate disposed so as to overlap with the first light guide plate in a plan view, and a light-reflecting layer interposed between the first light guide plate and the second light guide plate, and having a light-reflecting function on both the front and back surfaces thereof.

In this invention, the light-reflecting layer having a light-reflecting function on both the front and back surfaces thereof is interposed between the first light guide plate and the second light guide plate disposed so as to overlap with each other in a plan view, and light guided in the first light guide plate and light guided in the second light guide plate can be reflected by the light-reflecting layer. Therefore, the thickness can be made smaller than when providing two separate backlight devices. Moreover, since the light-reflecting layer can be used for both the front and back light guide plates, it is unnecessary to provide separate light-reflecting layers, and the thickness of the entire device can be further reduced. Since a single light-reflecting layer is provided, the cost of components and the number of assembly processes can be reduced. Herein, the light-reflecting layer includes all things that have an optical function of reflecting light by using various optical effects, such as light reflection, light scattering, and light refraction.

In this invention, it is preferable that the first light guide plate, the light-reflecting layer, and the second light guide plate be directly stacked. In this invention, since the first light guide plate, the light-reflecting layer, and the second light guide plate are directly stacked without another member or an adhesive layer (bonding layer) therebetween (or placed in direct contact with one another without a space therebetween), the thickness can be further reduced.

In this invention, it is preferable that a laminated member including the first light guide plate, the second light guide plate, and the light-reflecting layer be fixed to a common support member. This invention can provide an integrated electro-optical device (for example, a liquid crystal display device) having display surfaces on both the front and back sides. Moreover, since the first light guide plate and the second light guide plate are fixedly supported by a common support member, the thickness of the entire device can be further reduced. This covers a case in which both the first light guide plate and the second light guide plate are fixed to the support member, a case in which only the first light guide plate is fixed to the support member and the light-reflecting layer and the second light guide plate are fixed to the first light guide plate, and a case in which only the second light guide plate is fixed to the support member and the light-reflecting layer and the first light guide plate are fixed to the second light guide plate.

In this invention, it is preferable that the light-reflecting layer be bonded to at least one of the first light guide plate and the second light guide plate. In this invention, when the light-reflecting layer is bonded to one of the light guide plates, the thickness of the light guide device is slightly increased because of an adhesive layer or a bonding layer used to bond the light-reflecting layer and the light guide plate, but the assembly operation and the positioning operation can be easily performed after bonding. Preferably, a light-reflecting layer having an adhesive layer on one of the front and back surfaces thereof is used during the assembly operation.

In this invention, it is preferable that the light-reflecting layer be bonded to both the first light guide plate and the second light guide plate. In this invention, the thickness of the light guide device is slightly increased because of two adhesive layers or bonding layers used to bond the light-reflecting layer and the first and second light guide plates, but the assembly operation and the positioning operation can be more easily performed after bonding because the first light guide plate and the second light guide plate can be bonded with the light-reflecting layer therebetween.

A liquid crystal display device of the present invention includes a first light guide plate, a second light guide plate disposed so as to overlap with the first light guide plate, a light-reflecting layer interposed between the first light guide plate and the second light guide plate, and having a light-reflecting function on both the front and back surfaces thereof, a first electro-optical panel (for example, a first liquid crystal display) placed on the side of the first light guide plate opposite to the light-reflecting layer, and a second electro-optical panel (for example, a second liquid crystal display) placed on the side of the second light guide plate opposite to the light-reflecting layer.

In this invention, the light-reflecting layer having a light-reflecting function on both the front and back surfaces thereof is provided between the first light guide plate and the second light guide plate disposed so as to overlap with each other in a plan view, and light guided to the first light guide plate and light guided to the second light guide plate can be reflected by the light-reflecting layer, and therefore, both the first electro-optical panel and the second electro-optical panel can be illuminated. Consequently, the thickness can be made smaller than when providing two separate backlight devices. Moreover, since the light-reflecting layer can be used for both front and back light guide plates, it is unnecessary to provide separate light-reflecting layers, and the thickness of the entire device can be further reduced. Since the single light-reflecting layer is provided, the cost of components can be reduced, and the number of assembly processes can be reduced. The light-reflecting layer covers all things that have an optical function of reflecting light by using various optical effects, such as light reflection, light scattering, and light refraction.

In this invention, it is preferable that the first light guide plate, the light-reflecting layer, and the second light guide plate be directly stacked. In this invention, since the first light guide plate, the light-reflecting layer, and the second light guide plate are directly stacked without another member or an adhesive layer (bonding layer) therebetween (or placed in direct contact with one another without a space therebetween), the thickness can be further reduced.

In this invention, it is preferable that a laminated member including the first light guide plate, the second light guide plate, and the light-reflecting layer be fixed to a common support member. This invention can provide an integrated electro-optical device having display surfaces on both the front and back sides. Moreover, since the first light guide plate and the second light guide plate are fixedly supported by a common support member, the thickness of the entire device can be further reduced. This covers a case in which both the first light guide plate and the second light guide plate are fixed to the support member, a case in which only the first light guide plate is fixed to the support member and the light-reflecting layer and the second light guide plate are fixed to the first light guide plate, and a case in which only the second light guide plate is fixed to the support member and the light-reflecting layer and the first light guide plate are fixed to the second light guide plate.

In this invention, it is preferable that the light-reflecting layer be bonded to at least one of the first light guide plate and the second light guide plate. In this invention, when the light-reflecting layer is bonded to one of the light guide plates, the thickness of the light guide device is slightly increased because of an adhesive layer or a bonding layer used to bond the light-reflecting layer and the light guide plate, but the assembly operation and the positioning operation can be easily performed after bonding. Preferably, a light-reflecting layer having an adhesive layer on one of the front and back surfaces thereof is used during the assembly operation.

In this invention, it is preferable that the light-reflecting layer be bonded to both the first light guide plate and the second light guide plate. In this invention, the thickness of the light guide device is slightly increased because of two adhesive layers or bonding layers used to bond the light-reflecting layer and the first and second light guide plates, but the assembly operation and the positioning operation can be more easily performed after bonding because the first light guide plate and the second light guide plate can be bonded with the light-reflecting layer therebetween.

In the above inventions, both the first electro-optical panel (first liquid crystal display) and the second electro-optical panel (second liquid crystal display) may be fixed to the support member, or may be directly or indirectly fixed to the first light guide plate or the second light guide plate.

In this invention, it is preferable that the liquid crystal display device further include a first light source for emitting light toward the first light guide plate, and a second light source for emitting light toward the second light guide plate, and that the first light source and the second light source are located so as not to overlap with each other in a plan view. In this invention, since the first light source and the second light source are located so as not to overlap with each other in a plan view, it is possible to prevent the thickness reduction of the device from being hindered by the light sources. In a case in which at least one of the first light guide plate and the second light guide plate is shaped like a rectangle in plan view, it is preferable that the first light source and the second light source be placed close to different sides of the rectangle.

In order to achieve the above objects, a liquid crystal display device of the present invention includes a first electro-optical module and a second electro-optical module placed with the backs thereof facing each other. That is, when a display screen of the first electro-optical module is placed on the front side, a display screen of the second electro-optical module is placed on the back side.

More specifically, an electro-optical device of the present invention includes a first electro-optical module whose thickness gradually decreases in a predetermined direction, and a second electro-optical module whose thickness gradually decreases in a direction opposite to the predetermined direction, and the first electro-optical module and the second electro-optical module are placed with the backs thereof facing each other.

In this invention, since the first electro-optical module and the second electro-optical module are placed in a staggered manner as viewed from the direction of the decrease in thickness thereof, it is possible to achieve a thin electro-optical device having a display screen on both the front and back sides thereof.

Another liquid crystal display device of the present invention includes a first electro-optical panel, a first light guide plate placed behind the first electro-optical panel, a second light guide plate placed behind the first light guide plate, and a second electro-optical panel placed behind the second light guide plate. The first electro-optical panel and the second electro-optical panel can constitute a structural section having a display screen on both the front and back sides.

More specifically, an electro-optical device of the present invention includes a first electro-optical panel, a first light guide plate placed behind the first electro-optical panel so that the thickness thereof gradually decreases in a predetermined direction, a second light guide plate placed behind the first light guide plate so that the thickness thereof gradually decreases in a direction opposite to the predetermined direction, and a second electro-optical panel placed behind the second light guide plate.

In this invention, since the first light guide plate placed behind the first electro-optical panel has a thickness that gradually decreases in the predetermined direction, and the second light guide plate placed behind the first light guide plate has a thickness that gradually decreases in a direction opposite to the predetermined direction, the first light guide plate and the second light guide plate are arranged in a staggered manner as viewed from the direction of the change in thickness thereof. This can make the thickness of the entire device smaller than before. Since each of the two light guide plates is shaped (for example, like a wedge) so that the thickness thereof gradually decreases in a certain direction, it is possible to efficiently reflect light by the surface of the light guide plate opposite to the electro-optical panel, and to efficiently apply the light to the electro-optical panel. This makes it possible to produce a bright display while reducing the power consumption and the size of the light source.

In this case, it is only necessary that the first light guide plate and the second light guide plate are arranged so as at least to partially overlap with each other in a plan view, and the first light guide plate and the second light guide plate do not need to have the same planar shape and to overlap with each other in a plan view so that the shapes are aligned.

In this invention, it is preferable that the first light guide plate emit light toward the first electro-optical panel, and that the second light guide plate emit light toward the second electro-optical panel. This invention makes it possible to apply light onto both the first electro-optical panel and the second electro-optical panel placed on both sides by using the first light guide plate and the second light guide plate. Not only the second electro-optical panel, but also the first electro-optical panel may be illuminated with light emitted from the second light guide plate, or not only the first electro-optical panel, but also the second electro-optical panel may be illuminated with light emitted from the first light guide plate.

It is preferable that a light-scattering means, a light-diffusing means, or a light-reflecting means be placed between the first light guide plate and the second light guide plate so as to direct light introduced in the first light guide plate toward the first electro-optical panel, and to direct light introduced in the second light guide plate toward the second electro-optical panel. The light-scattering means, the light-diffusing means, or the light-reflecting means may include a portion for directing light introduced in the first light guide plate toward the first electro-optical panel and a portion for directing light introduced in the second light guide plate toward the second electro-optical panel, these portions being physically separate. In order to facilitate manufacturing and to further reduce the thickness, it is preferable that the portions be formed by a common (single) optical layer (for example, a sheet, layer, or plate). Since the number of components can also be reduced in this case, the cost of the product itself and the parts management cost can also be reduced.

In this invention, it is preferable that the liquid crystal display device further include a first light source placed on one side of the first light guide plate so as to introduce light into the first light guide plate, and a second light source placed on the other side of the second light guide plate, different from the one side, so as to introduce light into the second light guide plate. In this invention, since the first light source is placed on one side of the first light guide plate and the second light source is placed on the other side of the second light guide plate, the first light source and the second light source are disposed so as not to overlap with each other in a plan view. This can prevent the thickness reduction of the electro-optical device from being limited by the thicknesses of the light sources.

In order to enhance the light propagation efficiency, it is preferable that the first light source be placed beside the thickest portion of the first light guide plate, and it is similarly preferable that the second light source be placed beside the thickest portion of the second light guide plate.

It is preferable that the first light source and the second light source be placed on opposite sides, however, for example, in a case in which the first light guide plate and the second light guide plate are rectangular, when the first light source is placed adjacent to a certain side of the first light guide plate and the second light guide plate, the second light source may be placed adjacent to any of the three remaining sides.

In this invention, it is preferable that the first light guide plate and the second light guide plate be in direct contact with each other, or be disposed in contact with each other through an optical layer therebetween. In this invention, since the first light guide plate and the second light guide plate are in direct contact with each other, or are disposed in contact with each other through the optical layer therebetween, the thickness of the device can be further reduced. Herein, the optical layer refers to a layer having any optical effect on the light, such as a light-scattering layer, a light-diffusing layer, or a light-reflecting layer.

In this invention, it is preferable that the electro-optical device further include a support frame for engaging and holding the first light guide plate and the second light guide plate. In this invention, since the first light guide plate and the second light guide plate are engaged with and held by the common support frame, the mutual positional relationship between the light guide plates can be regulated, and the light guide plates can be contained in a small space. Furthermore, since light emerging from end faces of the first and second light guide plates other than the end faces at which the light sources are provided can be returned to the light guide plates again by providing the inner surface of the common support frame with a reflecting function, the light utilization efficiency can be enhanced.

An electronic apparatus of the present invention includes any of the above-described electro-optical devices, and a control means for controlling the electro-optical device.

This invention makes it possible to reduce the thickness of a structural section having a display screen on each of the front and back sides thereof. Furthermore, since the front electro-optical module and the back electro-optical module can be easily combined, the assembly operation is made easier, and the inner structure of the structural section can be simplified.

An illumination device of the present invention includes a first light guide plate, a second light guide plate placed behind the first light guide plate, a first light source opposing an end face of the first light guide plate, and a second light source opposing an end face of the second light guide plate. The first light guide plate has a light-emergent face opposite to the second light guide plate, and the second light guide plate has a light-emitting face opposite to the first light guide plate. Consequently, both the front and back sides of the first light guide plate and the second light guide plate can be illuminated. In particular, it is preferable that an optical sheet (for example, a light-reflecting layer, a light-scattering layer, or a light-diffusing layer) be placed between the first light guide plate and the second light guide plate. More specifically, an illumination device of the present invention includes a first light guide plate whose thickness gradually decreases in a predetermined direction, and a second light guide plate placed behind the first light guide plate so that the thickness thereof gradually decreases in a direction opposite to the predetermined direction.

DESCRIPTION OF THE PREFERRED EMBODIMENTS

A light guide device, an electro-optical device, and an electronic apparatus having the devices according to embodiments of the present invention will now be described with reference to the attached drawings.

First Embodiment

Figure 1:
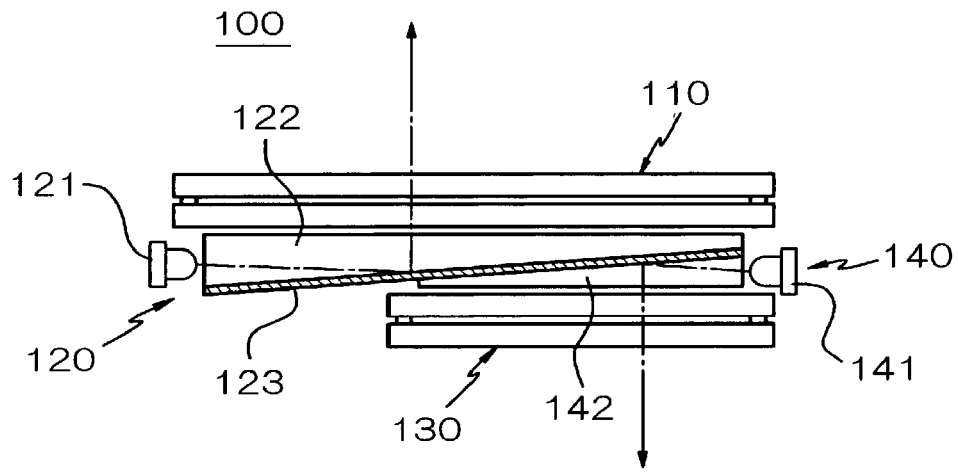
FIG. 1(a) is a schematic sectional view schematically showing the general configuration of an electro-optical device according to a first embodiment of the present invention.
FIG. 1(b) is a bottom view showing the plane layout of light guide plates and light sources.
Figure 1:
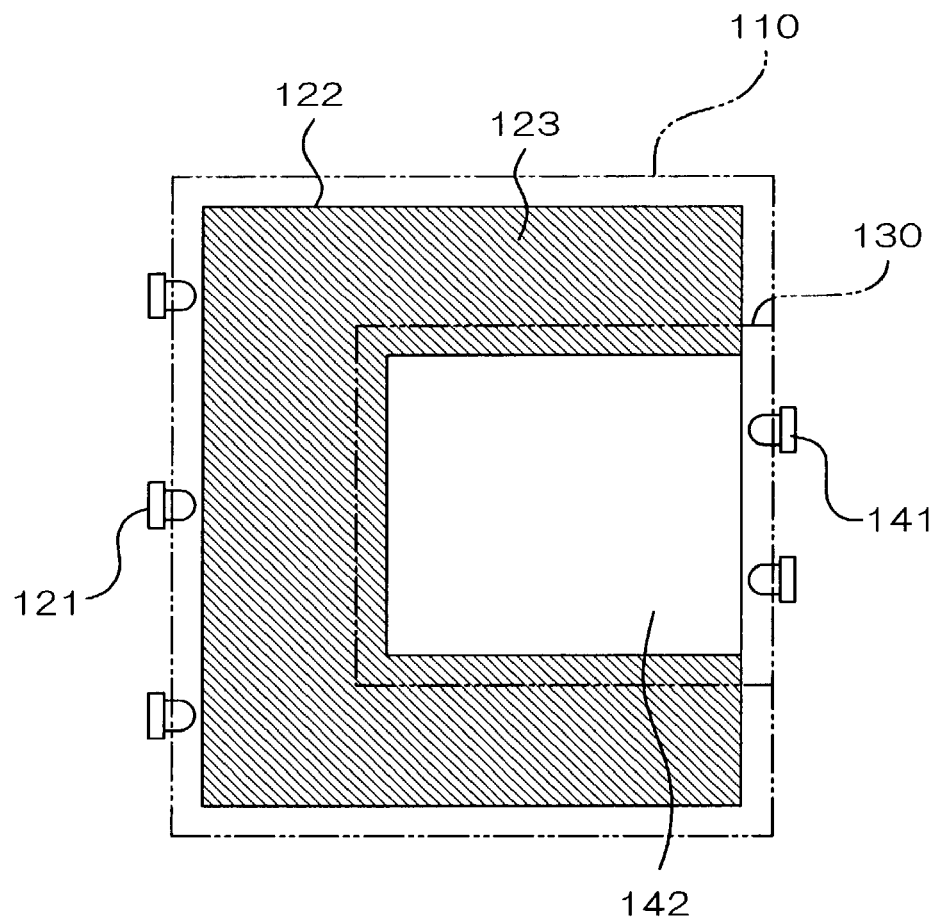

FIG. 1(a) is a schematic longitudinal sectional view showing the schematic configuration of a liquid crystal display device as an example of an electro-optical device of this embodiment, and FIG. 1(b) is a bottom view showing the plane layout of light guide plates.

A liquid crystal display device 100 includes a liquid crystal display panel (first liquid crystal display panel) 110, a backlight 120 for illuminating the liquid crystal display panel 110, a liquid crystal display panel (second liquid crystal display panel) 130 disposed with the back thereof facing the back of the liquid crystal display panel 110 so that its side opposite to the liquid crystal display panel 110 serves as a viewing side, and a backlight 140 for illuminating the liquid crystal display panel 130.

In this embodiment, the liquid crystal display panel 110 and the backlight 120 constitute a first electro-optical module (first liquid crystal display module), and the liquid crystal display panel 130 and the backlight 140 constitute a second electro-optical module (second liquid crystal display module).

Each of the liquid crystal display panels 110 and 130 is formed by bonding two substrates made of glass or the like with a sealing material, and sealing liquid crystal inside the sealing material. An electrode pattern is formed on the opposing inner surfaces of the two substrates so that the orientation of the liquid crystal changes according to the voltage applied between the electrodes opposing with the liquid crystal therebetween. Wiring patterns (not shown) are led out from the electrode patterns of these liquid crystal display panels. Semiconductor chips having a liquid-crystal driving circuit and the like are directly mounted on the wiring patterns, or signals are input from the outside to the wiring patterns through a wiring member such as a flexible wiring board.

The backlight 120 includes light sources (first light sources) 121 formed of, for example, LEDs (light-emitting diodes), a light guide plate (first light guide plate) 122 made of acrylic resin or the like, and a reflective sheet 123 bonded onto the back surface of the light guide plate 122. The backlight 140 includes light sources (second light sources) 141 formed of, for example, LEDs (light-emitting diodes), and a light guide plate (second light guide plate) 142 made of acrylic resin or the like. The above reflective sheet 123 is also used for the backlight 140.

Figure 2:
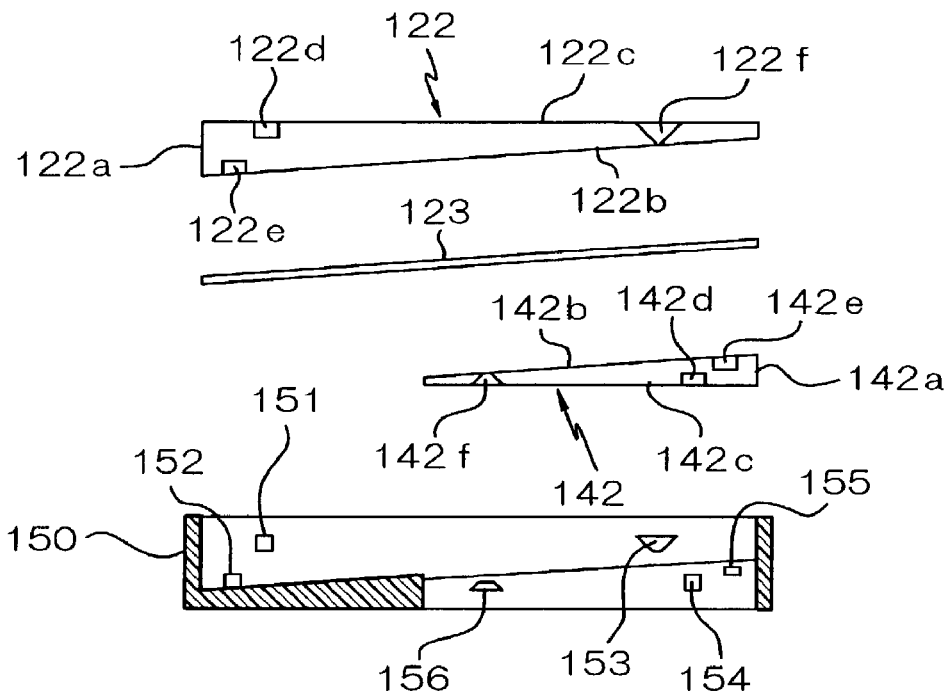
FIG. 2 is an exploded view of the light guide plates, a reflective sheet, and a support frame in the first embodiment.

FIG. 2 is an exploded side view showing the cross-sectional structures of the light-guide plates 122 and 142, the reflective sheet 123, and a support frame which will be described later. As shown in FIG. 2, the light guide plate 122 is shaped like a wedge whose thickness gradually decreases from the left end in the figure toward the right end. An end face 122a serving as a light incident face is formed at the thickest left end in the figure, a back face 122b is formed on the side of the reflective sheet 123, and a front face 122c is formed on the side opposite to the reflective sheet 123. Each of the back face 122b and the front face 122c is inclined at a predetermined angle. Each side face (an illustrated side face and an unillustrated opposite side face) of the light guide plate 122 has, on its thick side, an engaging groove 122d that opens at the front face 122c and an engaging groove 122e that opens at the back face 122b, and has, on its thin side, a V-shaped engaging groove 122f opening at the front face 122c.

The light guide plate 142 is shaped like a wedge whose thickness gradually decreases from the right end in the figure toward the left end. An end face 142a serving as a light incident face is formed at the thickest right end in the figure, a back face 142b is formed on the side of the reflective sheet 123, and a front face 142c is formed on the side opposite to the reflective sheet 123. Each of the back face 142b and the front face 142c is inclined at a predetermined angle. Each side face (an illustrated side face and an unillustrated opposite side face) of the light guide plate 142 has, on its thick side, an engaging groove 142d that opens at the front face 142c and an engaging groove 142e that opens at the back face 142b, and has, on its thin side, a V-shaped engaging groove 142f that opens at the front face 142c.

It is preferable that the back faces 122b and 142b of the light guide plates 122 and 142 have a fine uneven pattern (rough-surface pattern) for scattering and diffusing light introduced therein.

As the reflective sheet 123, a sheet including a reflecting layer made of aluminum foil or the like, a white synthetic resin sheet made of polyethylene terephthalate or the like, or a multilayer resin sheet, in which transparent layers (films) having different refractive indices are alternately stacked, may be used.

In the above embodiment, one or a plurality of light sources 121 adjoin and face the end face 122a of the light guide plate 122, and one or a plurality of light sources 141 adjoin and face the end face 142a of the light guide plate 142. The light sources 121 and 141 may be attached to the support frame which will be described later, or may be mounted on flexible wiring boards or the like (not shown) that are mounted on the liquid crystal display panels 110 and 130.

In this embodiment, light emitted from the light source 121 enters the light guide plate 122 from the end face 122a, and is substantially uniformly emitted from the front face 122c, for example, by being reflected by the back face 122b inside the light guide plate 122 and the reflective sheet 123 covering the back face 122b, thereby illuminating the liquid crystal display panel 110. Similarly, light emitted from the light source 141 enters the light guide plate 142 from the end face 142a, and is substantially uniformly emitted from the front face 142c, for example, by being reflected by the back face 142b inside the light guide plate 142 and the reflective sheet 123 covering the back face 142b, thereby illuminating the liquid crystal display panel 130.

A support frame 150 serves to mutually position the liquid crystal display panels 110 and 130 and the light guide plates 122 and 142, and may be integrally molded from synthetic resin or the like. The support frame 150 is provided with engaging projections 151 to 156 formed on a pair of opposing inner side faces so as to engage and hold the light guide plates 122 and 142.

Figure 3:
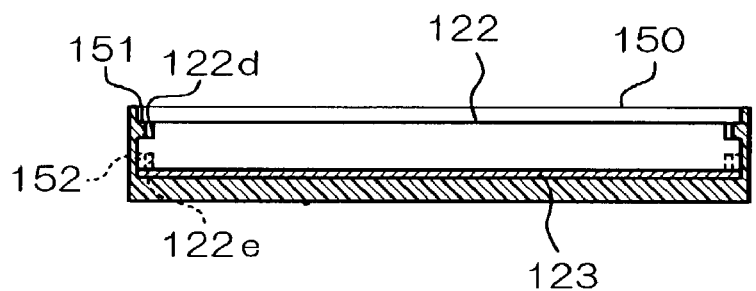
FIGS. 3(a) and 3(b) are cross-sectional views showing a state in which the light guide plates are mounted in the support frame in the first embodiment.
Figure 3:
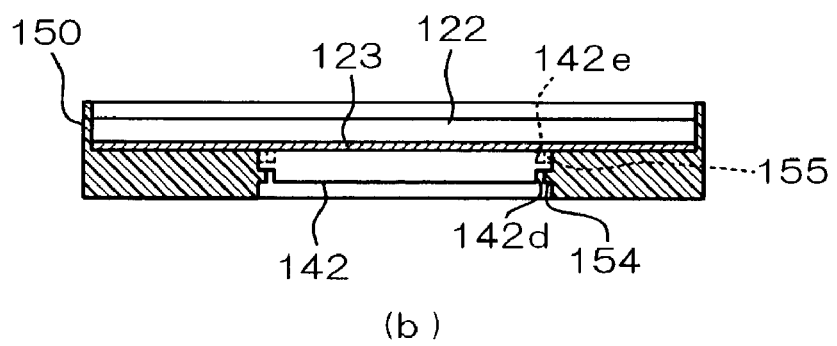

FIGS. 3(a) and 3(b) are schematic sectional views showing a state in which the light guide plates 122 and 142 and the reflective sheet 123 are assembled in the support frame 150 of this embodiment (sectional views taken along a plane orthogonal to the cross section of the support frame shown in FIG. 2). By press-fitting the light guide plate 122 from the upper side in the figure, the engaging projections 151 and 152 of the support frame 150 are engaged with the engaging grooves 122d and 122e of the light guide plate 122, and the engaging projection 153 of the support frame 150 is engaged with the engaging groove 122f of the light guide plate 122. The light guide plate 122 is thereby held in the support frame 150. Similarly, by press-fitting the light guide plate 142 into the support frame 150 from the lower side in the figure, the engaging projections 154 and 155 of the support frame 150 are engaged with the engaging grooves 142d and 142e of the light guide plate 142, and the engaging projection 156 of the support frame 150 is engaged with the engaging groove 142f of the light guide plate 142. The light guide plate 142 is thereby held in the support frame 150. The order of assembling the light guide plates 122 and 142 and the reflective sheet 123 into the support frame 150 is not limited to the above-described order, and may be arbitrarily changed. For example, the light guide plate 142, the reflective sheet 123, and the light guide plate 122 may be assembled into the support frame 150 in that order.

Since light leaking from the light guide plate (in particular, the end faces other then the light incident face) can be reflected so that it enters the light guide plate again by providing the inner surface of the support frame 150 with a reflecting function (for example, by forming a reflecting layer on the inner surface, or by setting the refractive index of the material of the support frame to be lower than the refractive index of the light guide plate), light utilization efficiency can be enhanced.

In this embodiment, as described above, the two liquid crystal display modules are placed back to back, the liquid crystal display modules are shaped like a wedge as a whole, and the wedges are placed in a staggered manner. Consequently, it is possible to reduce the thickness of the entire device having the two liquid crystal display modules.

In particular, in this embodiment, since the light guide plates 122 and 142 in the liquid crystal display modules are shaped like a wedge, the light guide efficiency of the light guide plates can be enhanced, and the liquid crystal display panels 110 and 130 can produce a brighter display.

Since the light source 121 and the light source 141 in the two liquid crystal display modules are placed on different sides, as viewed from the light guide plates 122 and 142, they do not overlap with each other in a plan view. This can prevent the thickness reduction of the liquid crystal display device from being hindered because of the thicknesses of the light sources.

In this embodiment, since the single reflective sheet 123 is interposed between the light guide plates 122 and 142, and functions as a light-reflecting means for both the backlights 120 and 140, it is unnecessary to provide a light-reflecting means for each light guide plate. This can further reduce the thickness of the device, and can reduce the number of processes for assembling the device.

Modification

Figure 4:
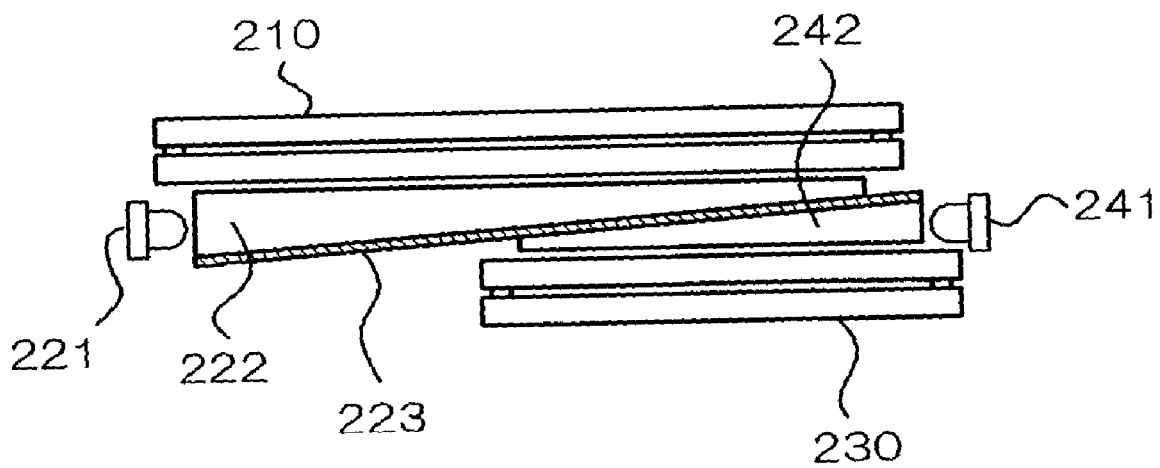
FIGS. 4(a) and 4(b) are schematic sectional views showing modifications of the first embodiment.
Figure 4:
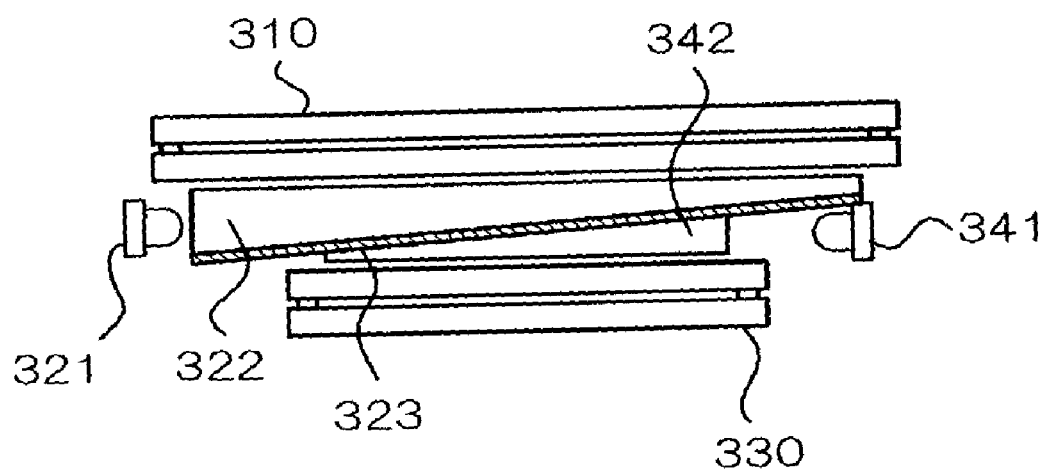

FIGS. 4(a) and 4(b) schematically show the configurations of modifications of the above embodiment. A liquid crystal display device 200 shown in FIG. 4(a) includes a liquid crystal display panel 210 substantially similar to that in the above embodiment, a light source 221, a light guide plate 222, a reflective sheet 223, a liquid crystal display panel 230, a light source 241, and a light guide plate 242. In the liquid crystal display device 200, the light guide plate 222 and the light guide plate 242 are placed so as to partially and two-dimensionally shift from each other and to form regions that two-dimensionally protrude from each other. In this case, the planar size increases, but the thickness of the entire liquid crystal display device 200 can be made even smaller than in the above embodiment.

A liquid crystal display device 300 shown in FIG. 4(b) includes a liquid crystal display panel 310 substantially similar to that in the above embodiment, a light source 321, a light guide plate 322, a reflective sheet 323, a liquid crystal display panel 330, a light source 341, and a light guide plate 342. In the liquid crystal display device 300, however, the light guide plate 342 is placed so that it is completely included inside the planar region of the light guide plate 322. This can reduce the planar size of the entire liquid crystal display device 300.

Second Embodiment

Figure 6:
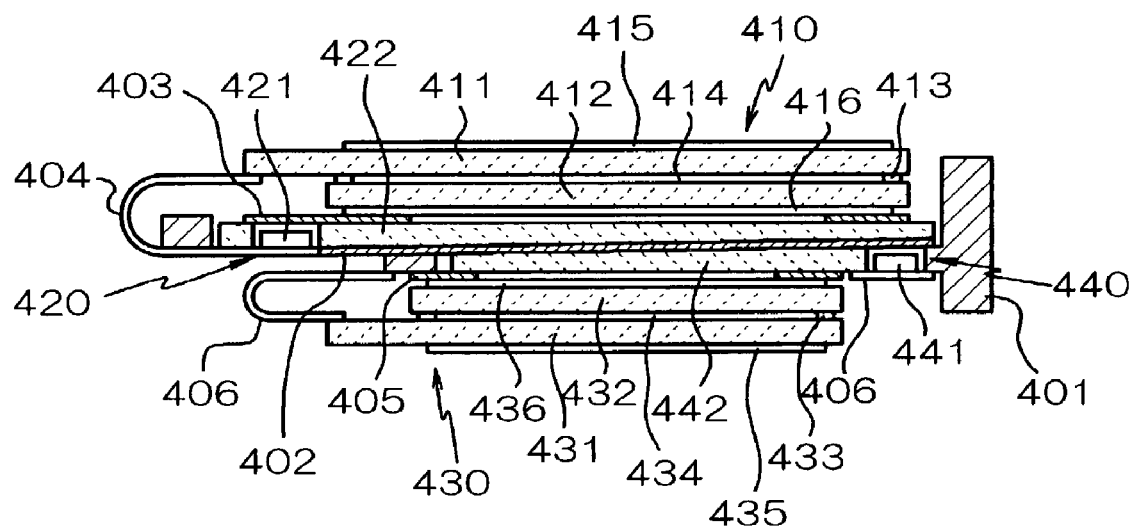
FIG. 6 is a schematic longitudinal sectional view schematically showing the overall configuration of the second embodiment.

A description will now be given of a second embodiment having a configuration, which is substantially similar to that of the above first embodiment, but is more concrete, with reference to FIG. 6. FIG. 6 is a schematic longitudinal sectional view showing the schematic configuration of a light guide device and an electro-optical device according to a second embodiment of the present invention. A liquid crystal display device 400 includes a liquid crystal display panel (first electro-optical panel) 410, a backlight 420 for illuminating the liquid crystal display panel 410, a liquid crystal display panel (second electro-optical panel) 430 disposed with the back thereof facing the back of the liquid crystal display panel 410 so that its side opposite to the liquid crystal display panel 410 serves as a viewing side, and a backlight 440 for illuminating the liquid crystal display panel 430.

The liquid crystal display panels 410 and 430 are respectively formed by bonding two substrates 411 and 412 and two substrates 431 and 432 made of glass or the like with sealing materials 413 and 433, and sealing liquid crystals 414 and 434 inside the sealing materials 413 and 433. Electrode patterns are formed on the opposing inner surfaces of the two substrates 411 and 412 and the two substrates 431 and 432, and the orientation of the liquid crystals 414 and 434 changes depending on the voltage applied between the electrodes opposing with the liquid crystals 414 and 434 therebetween. Wiring patterns (not shown) are led out from the electrode patterns of the liquid crystal display panels 410 and 430, and signals are input from the outside to the wiring patterns through wiring members 404 and 406 formed of a flexible wiring board. Semiconductor chips having a liquid-crystal driving circuit and the like may be directly mounted on the liquid crystal display panels 410 and 430.

In this embodiment, the liquid crystal display panel 410 and the backlight 420 constitute a first liquid crystal display module (first electro-optical module), and the liquid crystal display panel 430 and the backlight 440 constitute a second liquid crystal display module (second electro-optical module).

While the liquid crystal display modules are described as an example in this embodiment, in the case of a self-luminous device, such as an organic electroluminescence device, that does not need a backlight (illumination device), the first electro-optical module and the second electro-optical module described above are formed by only a light-emitting panel, and are placed one on the other with the backs thereof facing each other. Preferably, a light-reflecting layer is placed between the light-emitting panels, and the light-reflecting layer is common to the front and back light-emitting panels.

The backlight 420 includes a light source (first light source) 421 formed of an LED (light-emitting diode) or the like, and a light guide plate (first light guide plate) 422 made of acrylic resin or the like. The backlight 440 includes a light source (second light source) 441 formed of an LED (light-emitting diode) or the like, and a light guide plate (second light guide plate) 442 made of acrylic resin or the like. In both the backlight 420 and the backlight 440, a reflective sheet (light-reflecting layer) 402 interposed between the light guide plate 422 and the light guide plate 442 serves to reflect light emitted from the light sources 421 and 441 and propagating in the light guide plates 422 and 442, to direct the light in the light guide plate 422 toward the liquid crystal display panel 410, and to direct the light in the light guide plate 442 toward the liquid crystal display panel 430.

Figure 5:
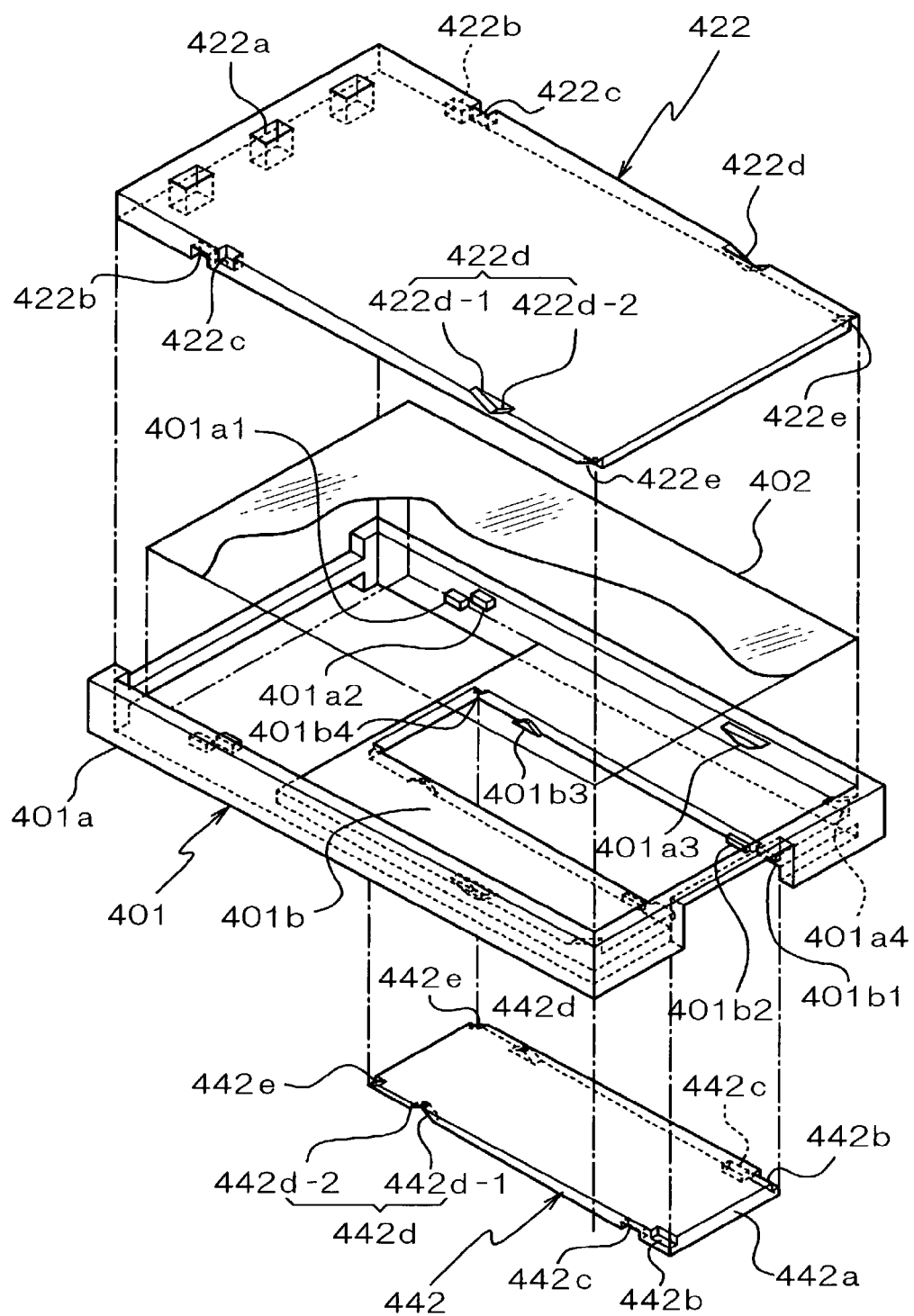
FIG. 5 is an exploded perspective view showing the configuration of a light guide device section in a light guide device and an electro-optical device according to a second embodiment of the present invention.

A support member 401 is made of a material, such as synthetic resin, for example, by integral molding. The support member 401 engages and holds the light guide plate 422 and the light guide plate 442. FIG. 5 shows a more detailed configuration of a light guide device constituted by the support member 401, the reflective sheet 402, the light guide plate 422, and the light guide plate 442.

As shown in FIG. 5, the support member 401 is shaped like a frame as a whole, and includes a substantially rectangular outer frame portion 401a and an inner frame portion 401b that extends inward from the outer frame portion 401a. Each of a pair of opposing inner surfaces of the outer frame portion 401a is provided with rectangular projections 401a1 and 401a2, an inverse-triangular projection 401a3 having a pair of engaging faces inclined downward, and a projection 401a4 having an engaging face inclined upward. Each of a pair of opposing inner surfaces of the inner frame portion 401b is provided with rectangular projections 401b1 and 401b2, a projection 401b3 having a pair of engaging faces inclined upward, and a projection 401b4 having an engaging face inclined downward.

The light guide plate 422 has light-source accommodating holes 422a vertically formed through one end thereof. Each of a pair of side edges of the light guide plate 422 is provided with rectangular recesses 422b and 422c, an inverse-triangular recess 422d having a first inclined face 422d-1 and a second inclined face 422d-2 inclined upward, and a cutout recess 422e having an downwardly inclined face. The recesses 422b, 422c, 422d, and 422e open on the sides of the light guide plate 422 and on the front or rear side in the thickness direction (upper or lower side in the figure) of the light guide plate 422. The first inclined face 422d-1 points toward the other end opposite to the one end at which the light-source accommodating holes 422a are formed, and the second inclined face 422-d points toward the one end at which the light-source accommodating holes 422a are formed. The first inclined face 422d-1 and the second inclined face 422d-2 in the recess 422d point toward the front side (upper side in the figure) of the light guide plate 422, and the inclined face in the recess 422e points toward the rear side (lower side in the figure) of the light guide plate 422.

The light guide plate 442 also has a light incident face 442a serving as one end face, and each of a pair of side edges is provided with rectangular recesses 442b and 442c, a triangular recess 442d having a first inclined face 442d-1 and a second inclined face 442d-2 inclined downward, and a cutout recess 442e having an upwardly inclined face. The recesses 442b, 442c, 442d, and 442e open on the sides of the light guide plate 442 and on the front or rear side in the thickness direction (upper or lower side in the figure) of the light guide plate 442. The first inclined face 442d-1 points toward the other end opposite to the one end at which the light incident face 442a is formed, and the second inclined face 442d-2 points toward the one end at which the light incident face 442a is formed. The first inclined face 442d-1 and the second inclined face 442d-2 in the recess 442d point toward the front side (upper side in the figure) of the light-guide plate 442, and the inclined face in the recess 442e points toward the rear side (lower side in the figure) of the light guide plate 442.

Figure 7:
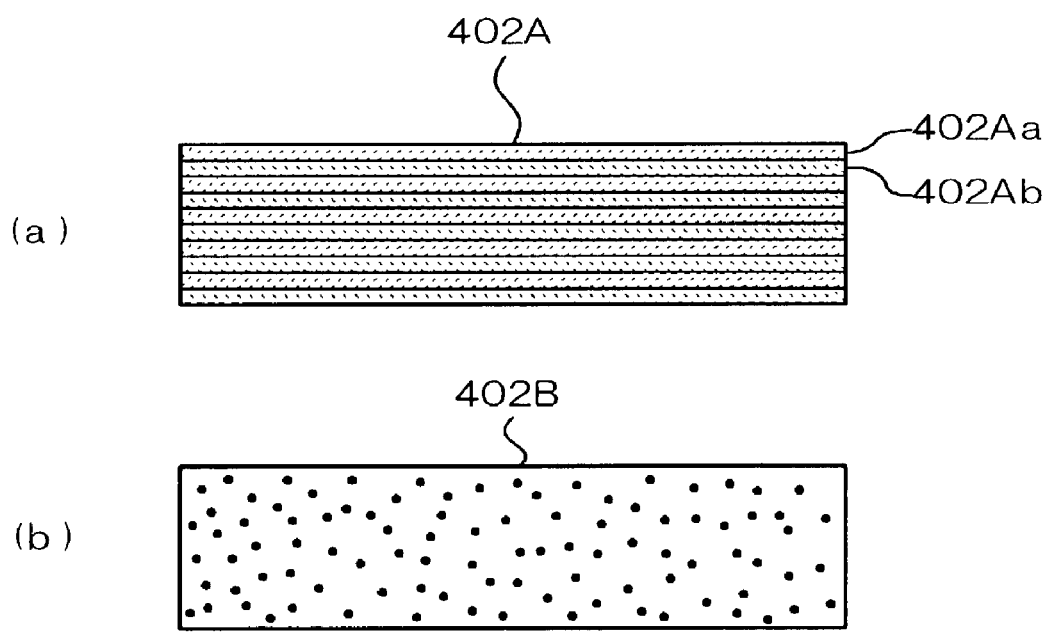
FIGS. 7(a) and 7(b) are cross-sectional views showing examples of structures of a reflective sheet in the second embodiment.

The reflective sheet 402 can reflect light by both the front and back surfaces thereof, and may be made of a reflective material, such as a metal layer of aluminum or the like, or a multilayer composed of a metal layer and a transparent layer. In particular, high reflectance can be achieved by using a known multilayer reflective film 402A in which light-transmissive layers 402Aa and 402Ab having different refractive indices are alternately stacked, as shown in FIG. 7(a). Furthermore, uniform white light can be obtained at low cost by using a white (scattering) film 402B made of polycarbonate resin or the like, as shown in FIG. 7(b).

By pressing the light guide plate 422 from the upper side in the figure in a state in which the reflective sheet 402 is placed on the inner frame portion 401b of the above support member 401, the recesses 422b, 422c, 422d, and 422e are engaged with the projections 401a1 and 401a2, so that the light guide plate 422 can be fixedly supported in the support member 401. By pressing the light guide plate 442 into the support member 401 from the lower side in the figure, the recesses 442b, 442c, 442d, and 442e are engaged with the projections 401b1, 401b2, 401b3, and 401b4, so that the light guide plate 442 can be fixedly supported in the support member 401. By doing this, the reflective sheet 402 is held while being clamped between the light guide plates 422 and 442.

In this embodiment, the light guide plate 422 is shaped like a wedge whose thickness gradually decreases from the left end in FIG. 5 toward the right end, and the light-source accommodating holes 422a are formed in the thickest left end in the figure. The light guide plate 442 is shaped like a wedge whose diameter gradually decreases from the right end in the figure toward the left end, and the light incident face 442a is formed at the thickest right end. Therefore, the light guide plate 422 and the light guide plate 442 overlap with each other in a staggered manner, as viewed from the direction of the change in thickness thereof. This can further reduce the thickness of the total liquid crystal display device 400.

In this embodiment, as shown in FIG. 6, light sources 421 are mounted on the wiring member 404 that is connected to the liquid crystal display panel 410, and are placed inside the light-source accommodating holes 422a of the light guide plate 422. Consequently, light emitted from the light source 421 enters the light guide plate 422, propagates inside the light guide plate 422, is reflected by the reflective sheet 402, and is emitted toward the liquid crystal display panel 410. As a result, an image formed on the liquid crystal display panel 410 can be viewed from the upper side in the figure. The light source 441 is mounted on the wiring member 406 that is connected to the liquid crystal display panel 430, and faces the light incident face 442a of the light guide plate 442. Consequently, light emitted from the light source 441 enters the light guide plate 442, propagates inside the light guide plate 442, is reflected by the reflective sheet 402, and is emitted toward the liquid crystal display panel 430. As a result, an image formed on the liquid crystal display panel 430 can be viewed from the lower side in the figure.

Since light leaking from the light guide plate (in particular, the end faces other than the light incident face) can be reflected so as to enter the light guide plate again by providing the inner surface of the support member 401 (for example, forming a reflective layer on the inner surface, or setting the refractive index of the material of the support member to be lower than the refractive index of the light guide plate), light utilization efficiency can be enhanced.

In this embodiment, the light guide plates 422 and 442 can be made thin by the structure for fixing the light guide plates 422 and 442 and the support member 401 described above. Moreover, since the two liquid crystal display modules are placed with the backs thereof facing each other, the liquid crystal display modules are shaped like a wedge as a whole, and the wedges are placed in a staggered manner, as described above, it is possible to reduce the thickness of the entire device having the two liquid crystal display modules.

In particular, since the light guide plates 422 and 442 in the liquid crystal display modules are shaped like a wedge in this embodiment, the light guide efficiency of the light guide plates can be enhanced, and the liquid crystal display panels 410 and 430 can produce a bright display.

Since the light sources 421 and the light source 441 in the two liquid crystal display modules are placed on different sides, as viewed from the light guide plates 422 and 442, they do not overlap with each other in a plan view. This can prevent the size reduction of the liquid crystal display device from being hindered because of the thickness of the light sources.

Furthermore, in this embodiment, since the single reflective sheet 402 is interposed between the light guide plates 422 and 442, and functions as a light-reflecting means for both the backlights 420 and 440, it is unnecessary to provide a light-reflecting means for each light guide plate. This makes it possible to further reduce the thickness of the device, to reduce the cost of components, and to reduce the number of assembly processes of the device.

Third Embodiment

A light guide device and a liquid crystal display device according to a third embodiment of the present invention will now be described with reference to FIGS. 8 and 9. A liquid crystal display device 500 of this embodiment includes a support member 501, a reflective sheet 502, a liquid crystal display panel 510 (substrates 511 and 512, a sealing material 513, liquid crystal 514, and polarizers 515 and 516), a backlight 520 (a light source 521 and a light guide plate 522), a liquid crystal display panel 530 (substrates 531 and 532, a sealing material 533, liquid crystal 534, polarizers 535 and 536), and a backlight 540 (a light source 541 and a light guide plate 542), which are substantially similar to those in the above-described second embodiment, and therefore, descriptions of the same components are omitted.

Figure 8:
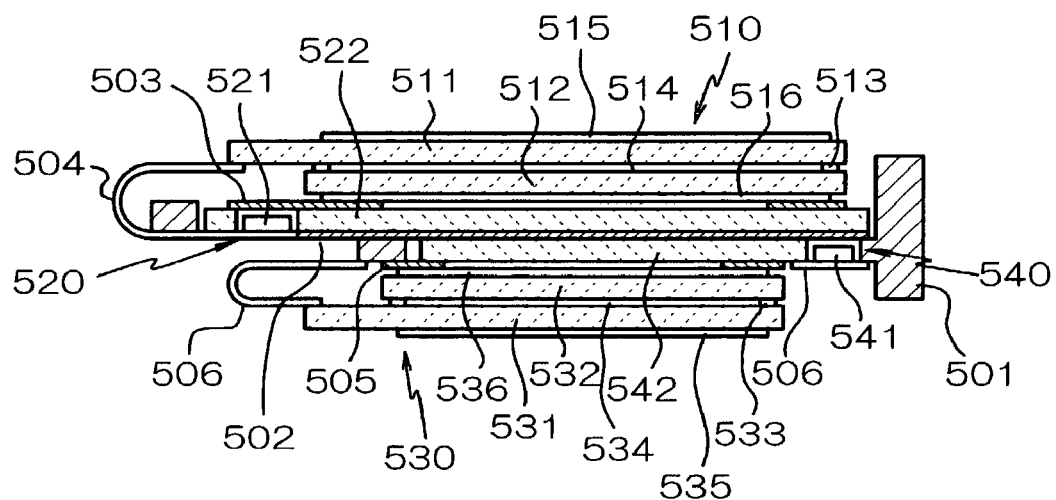
FIG. 8 is a schematic sectional view showing the overall configurations of a light guide device and a liquid crystal display device according to a third embodiment of the present invention.

A first difference of this embodiment from the second embodiment is that the light guide plates 522 and 542 are not shaped like a wedge, but are shaped like a parallel plate (flat plate), as shown in FIG. 8. Unlike the second embodiment, two wedge-shaped light guide plates are not stacked in a staggered manner in this embodiment, and this does not contribute to thickness reduction. However, since the light guide plates 522 and 542 are stacked with a single reflective sheet 502 therebetween, and are supported by a common support member 501, the thickness can be made smaller than in the known structure in which two separate liquid crystal display devices are provided.

A second difference of this embodiment from the second embodiment is that an adhesive layer 502As or 502Bs is formed on at least one surface of a reflective sheet 502A or 502B similar to that in the second embodiment, and the reflective sheet 502A or 502B is bonded to the light guide plate 522 with the adhesive layer 502As or 502Bs. Although the thickness of the device is slightly increased because of the adhesive layer 502As or 502Bs in this case, operations of assembling and positioning the liquid crystal display device 500 can be performed with great ease, for example, by bonding the reflective sheet 502 to the light guide plate 522 before the light guide plate 522 is engaged with the support member 501. More specifically, since the reflective sheet 502 is bonded to the light guide plate 522 beforehand, it is not displaced when engaging the light guide plate 522 with the support member 501, and does not need to be fixed to the support member 501.

Figure 9:
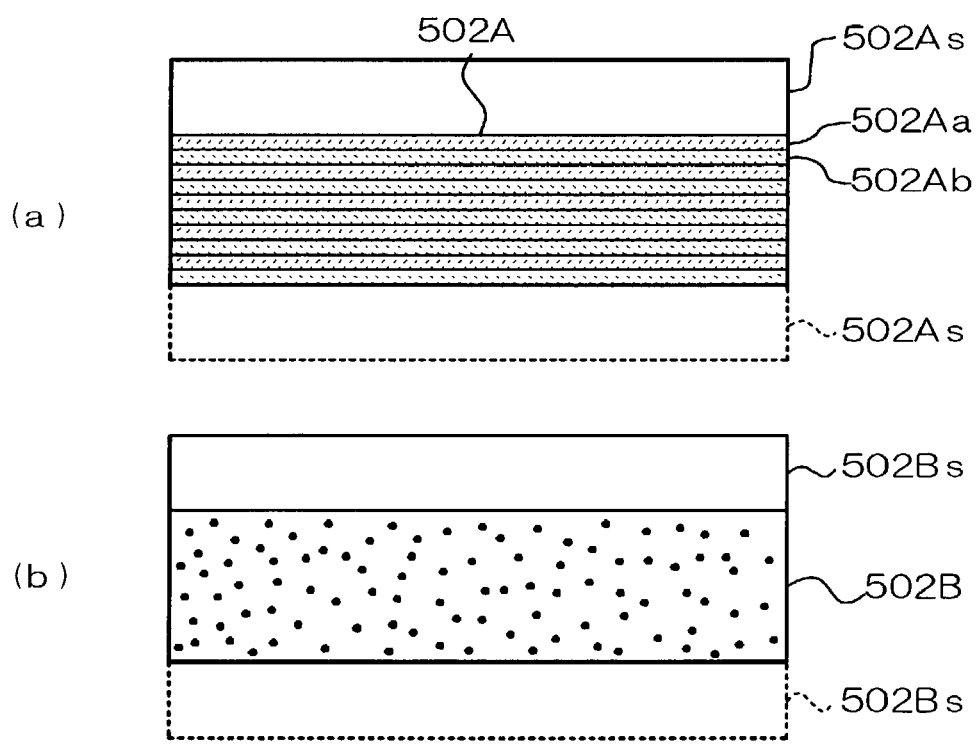
FIGS. 9(a) and 9(b) are cross-sectional views showing examples of structures of a reflective sheet in the third embodiment.

The reflective sheet 502 can also be bonded to the other light guide plate 542 by forming the adhesive layer 502As or 502Bs on both the front and back surfaces of the reflective sheet 502A or 502B, as shown by a dotted line in FIG. 9. Therefore, simply by fixedly engaging one of the light guide plates 522 and 542 to the support member 501 rather than fixedly engaging both the light guide plates 522 and 542 to the support member 501, as in the second embodiment, the other light guide plate can be indirectly and fixedly supported. This can make the assembly operation easier.

Fourth Embodiment

Figure 10:
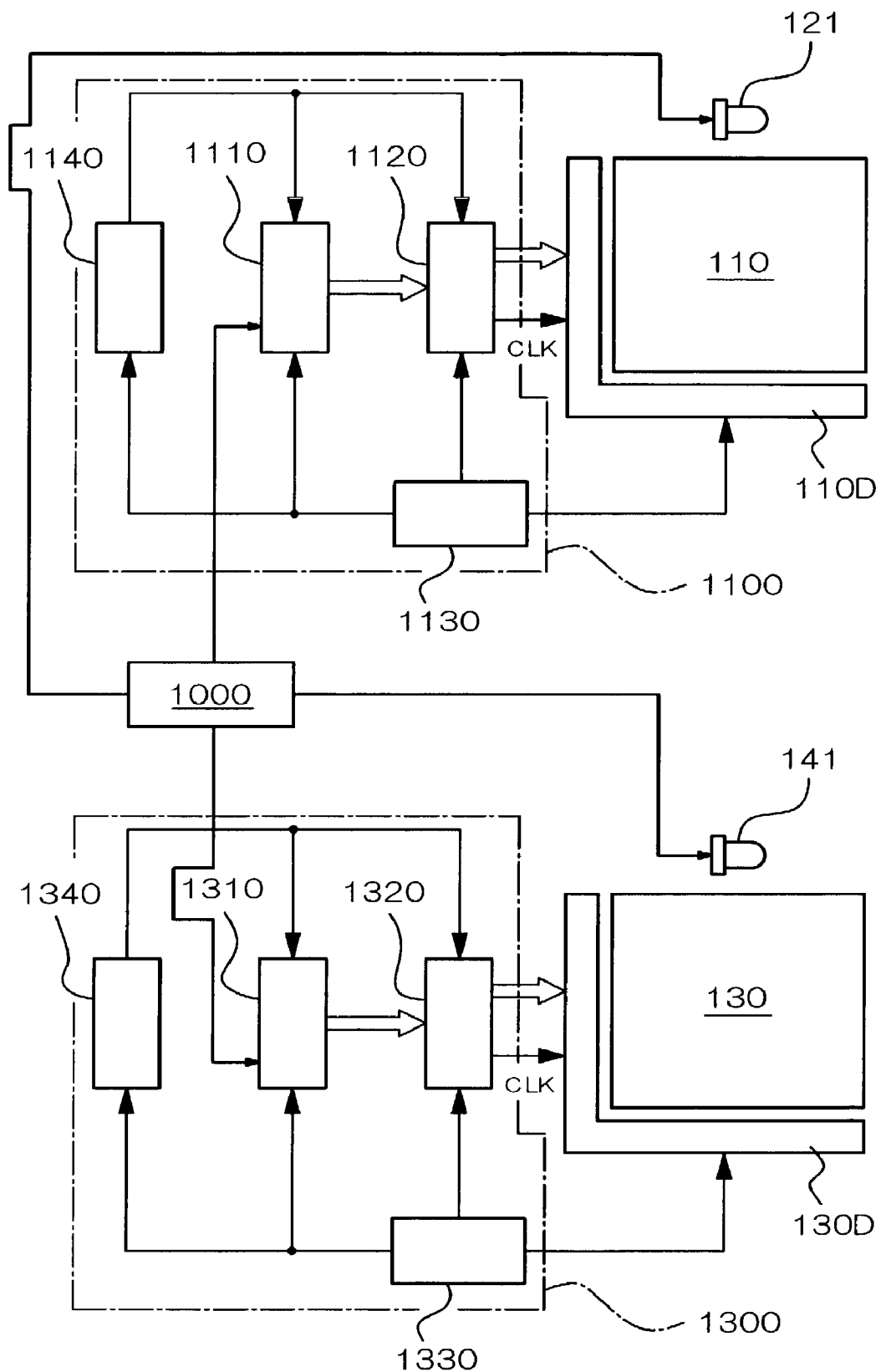
FIG. 10 is a schematic structural block diagram showing the configuration of a control system in an electronic apparatus according to an embodiment of the present invention.

An electronic apparatus of an embodiment having the above-described liquid crystal display device 100 will now be described with reference to FIGS. 10 and 11. As shown in FIG. 10, the electronic apparatus of this embodiment includes a control means 1100 for controlling the above liquid crystal display panel 110, and a control means 1300 for controlling the above liquid crystal display panel 130. The control means 1100 and 1300 are controlled by a central control section 1000 formed of, for example, a microcomputer placed inside the electronic apparatus.

The liquid crystal display panels 110 and 130 are respectively connected to driving circuits 110D and 130D mounted thereon or connected thereto via a wiring member, and formed of a semiconductor IC or the like, and these driving circuit 110D and 130D are connected to the control means 1100 and 1300. The control means 1100 and 1300 respectively include display-information output sources 1110 and 1310, display processing circuits 1120 and 1320, power-supply circuits 1130 and 1330, and timing generators 1140 and 1340.

The display-information output sources 1110 and 1310 include a memory such as a ROM (Read Only Memory) or a RAM (Random Access Memory), a storage unit such as a magnetic recording disk or an optical recording disk, and a synchronizing circuit for synchronously outputting a digital image signal, and supply display information, for example, in the form of a predetermined-format image signal, to the display-information processing circuits 1120 and 1130 in response to various clock signals generated by the timing generators 1140 and 1340.

The display-information processing circuits 1120 and 1320 include various known circuits, such as a serial-parallel conversion circuit, an amplifying and inverting circuit, a rotation circuit, a gamma correction circuit, and a clamp circuit, and process input display information and supply the image information to the driving circuit with a clock signal CLK. The driving circuits 110D and 130D include a scanning-line driving circuit, a data-line driving circuit, and a test circuit. The power-supply circuits 1130 and 1330 supply a predetermined voltage to the above-described components.

The central control section 1000 appropriately sends an on/off command and original display information to the display-information output sources 1110 and 1310 of the control means 1100 and 1300 so that the display-information output sources 1110 and 1310 output corresponding display information, and causes the liquid crystal display panels 110 and 130, via the control means 1100 and 1300 and the driving circuits 110D and 130D, to display an appropriate display image. The central control section 1000 also controls the on/off state of the light sources 121 and 141.

Figure 11:
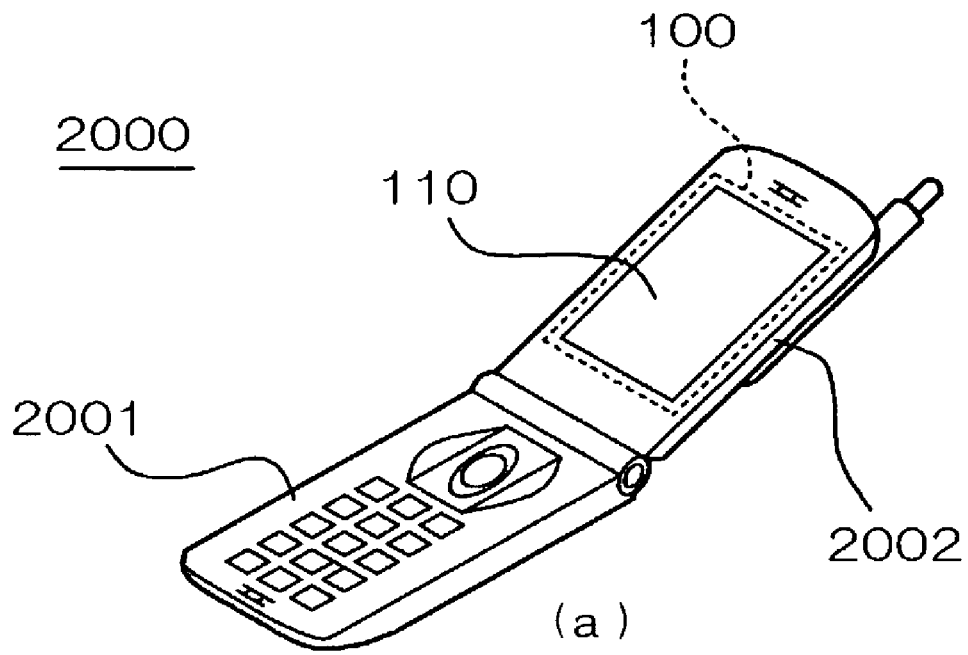
FIGS. 11(a) and 11(b) are schematic perspective views of the electronic apparatus according to an embodiment of the present invention.
Figure 11:
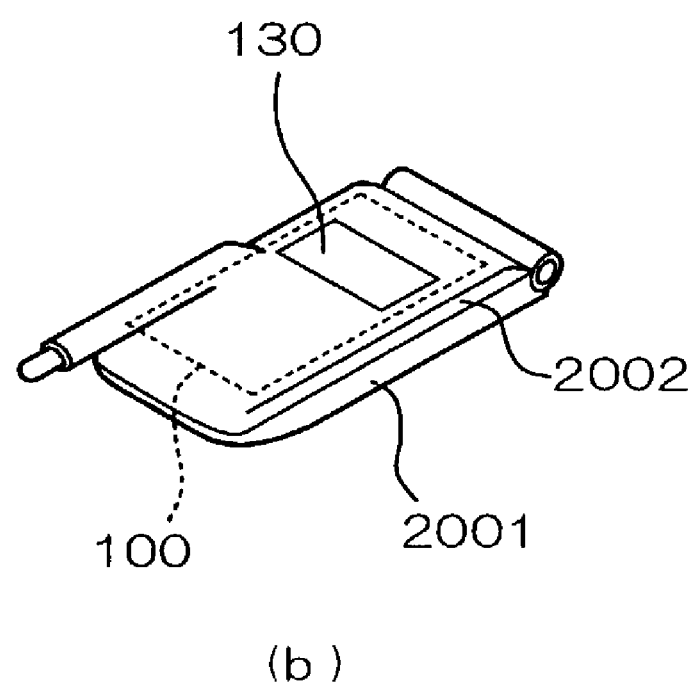
Figure 12:
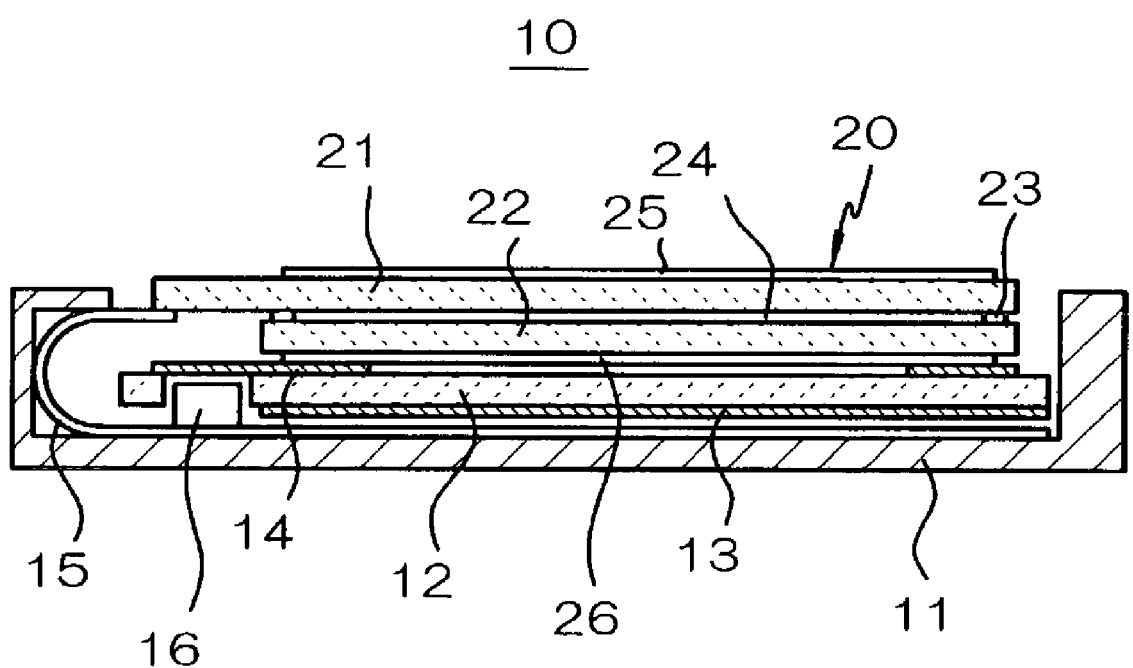
FIG. 12 is a schematic sectional view schematically showing the overall configuration of a conventional liquid crystal display device.

FIG. 11 shows a portable telephone 2000 serving as an electronic apparatus according to an embodiment of the invention. The portable telephone 2000 includes a body section 2001 provided with various control buttons and incorporating a microphone, and a display section 2002 provided with a display screen and an antenna and incorporating a speaker, and the body section 2001 and the display section 2002 can tilt relative to each other. The display section 2002 incorporates the above-described liquid crystal display device 100 so that the display screen of the liquid crystal display panel 110 is viewable on the inner surface thereof, and so that the display screen of the liquid crystal display panel 130 is viewable on the outer surface thereof.

In this embodiment, by opening the display section 2002 from the body section 2001, as shown in FIG. 11(*a*), the liquid crystal display panel 110 is switched on to display a predetermined image in response to a command from the central control section 1000. By tilting the display section 2002 onto the body section 2001, as shown in FIG. 11(*b*), the liquid crystal display panel 110 is switched off, and the liquid crystal display panel 130 is switched on instead so as to display a predetermined image.

Since the thickness of the liquid crystal display device 100 is reduced in this embodiment, as described above, the thickness of the display section 2002 can also be reduced. In addition, the inner structure is simplified, and the assembly operation is easy.

The electro-optical device and the electronic apparatus of the present invention are not limited to the above illustrated examples, and various changes are, of course, possible without departing from the scope of the invention. For example, while a liquid crystal display panel is used as the electro-optical panel in the above embodiments, the electro-optical panel of the present invention may include various electro-optical panels such as an organic electroluminescent panel and a plasma display panel. An electroluminescent panel may be used as the above light guide member.

As described above, the present invention can reduce the thicknesses of the light guide device that can guide light to both the front and back surfaces, the electro-optical device having a display screen on both the front and back sides, and the electronic apparatus including these devices.

The entire disclosures of Japanese patent application Nos. 2001-270581 filed Sep. 6, 2001, 2001-349104 filed Nov. 14, 2001 and 2002-223167 filed Jul. 31, 2002 are hereby incorporated by reference.

The invention claimed is:

1. A light guide device comprising:
   a first light guide plate;

a second light guide plate disposed so as to overlap with the first light guide plate in a plan view, the second light guide plate being smaller than the first light guide plate;

a light-reflecting layer interposed in an interval separating the first light guide plate and a support member, and having a light-reflecting function on both front and back surfaces thereof; and the support member supports a positional relationship of the first light guide plate and the second light guide plate interposed in an interval separating the first light guide plate and the second light guide plate, the support member having an inner surface that confronts the first light guide plate and the second light guide plate, the inner surface of the support member being provided with a reflecting function;

the support member includes an aperture opposing a surface of the first light guide plate, the aperture is smaller than the first light guide plate; and the second light guide plate is supported by the support member so as to be in the aperture.

2. A light guide device according to claim 1, wherein the first light guide plate, the light-reflecting layer, and the second light guide plate are directly stacked.

3. A light guide device according to claim 2, wherein a laminated member including the first light guide plate, the second light guide plate, and the light-reflecting layer is fixed to the support member.

4. A light guide device according to claim 3, wherein the light-reflecting layer is bonded to at least one of the first light guide plate and the second light guide plate.

5. A light guide device according to claim 3, wherein the light-reflecting layer is bonded to both the first light guide plate and the second light guide plate.

6. A light guide device according to claim 1, wherein the inner surface of the support member is formed with a reflecting layer.

7. A light guide device according to claim 1, wherein the inner surface of the support member has a lower refractive index than at least one of the first light guide plate and the second light guide plate.

8. An electro-optical device comprising:
a first light guide plate;
a second light guide plate disposed so as to overlap with the first light guide plate in a plan view, the second light guide plate being smaller than the first light guide plate;
a light-reflecting layer interposed in an interval separating the first light guide plate and a support member, and having a light-reflecting function on both front and back surfaces thereof;
a first electro-optical panel placed on a side of the first light guide plate, the side being opposite to the light-reflecting layer;
a second electro-optical panel placed on a side of the second light guide plate, the side being opposite the light-reflecting layer, the second electro-optical panel being smaller than the first electro-optical panel; and
the support member supports a positional relationship of the first light guide plate and the second light guide plate interposed in an interval separating the first light guide plate and the second light guide plate, the support member having an inner surface that confronts the first light guide plate and the second light guide plate, the inner surface of the support member being provided with a reflecting function;
the support member includes an aperture opposing a surface of the first light guide plate, the aperture is smaller than the first light guide plate; and
the second light guide plate is supported by the support member so as to be in the aperture.

9. An electro-optical device according to claim 8, wherein the first light guide plate, the light-reflecting layer, and the second light guide plate are directly stacked.

10. An electro-optical device according to claim 9, wherein a laminated member including the first light guide plate, the second light guide plate, and the light-reflecting layer is fixed to the support member.

11. An electro-optical device according to claim 10, wherein the light-reflecting layer is bonded to at least one of the first light guide plate and the second light guide plate.

12. An electro-optical device according to claim 10, wherein the light-reflecting layer is bonded to both the first light guide plate and the second light guide plate.

13. An electra-optical device according to claim 12, further comprising:
a first light source for emitting light toward the first light guide plate; and
a second light source for emitting light toward the second light guide plate,
wherein the first light source and the second light source are located so as not to overlap with each other in a plan view.

14. An electro-optical device comprising:
a first electra-optical module whose thickness gradually decreases in a predetermined direction, the first electra-optical module operable to display an image on a first side of the device, the first electra-optical module including a first light guide plate having a first accommodating section;
a second electra-optical module whose thickness gradually decreases in a direction opposite to the predetermined direction being smaller than the first electro-optical module, the second electra-optical module including a second light guide plate being smaller than the first light guide plate, the second light guide plate including a second accommodating section;
a light-reflecting layer interposed in an interval separating the first light guide plate and a support member, and having a light-reflecting function on both front and back surfaces thereof; and
the support member comprises projections that engage the first accommodating section and the second accommodating section, the support member interposed in an interval separating the first light guide plate and the second light guide plate;
the support member includes an aperture opposing a surface of the first light guide plate, the aperture is smaller than the first light guide plate; and
the second light guide plate is supported by the support member so as to be in the aperture.

15. An electro-optical device comprising:
a first electro-optical panel;
a first light guide plate placed behind the first electro-optical panel so that the thickness thereof gradually decreases in a predetermined direction, the first light guide plate including a first accommodating section;
a second light guide plate placed behind the first light guide plate so that the thickness thereof gradually decreases in a direction opposite to the predetermined direction, the second light guide plate including a second accommodating section, the second light guide plate is smaller than the first light guide plate;
a second electro-optical panel placed behind the second light guide plate, the second electro-optical panel being smaller than the first electro-optical panel;

a light-reflecting layer interposed in an interval separating the first light guide plate and a support member, and having a light-reflecting function on both front and back surfaces thereof;

the support member comprises projections that engage the first accommodating section and the second accommodating section, the support member interposed in an interval separating the first light guide plate and the second light guide plate; and the support member includes an aperture opposing a surface of the first light guide plate, the aperture is smaller than the first light guide plate; and the second light guide plate is supported by the support member so as to be in the aperture.

16. An electro-optical device according to claim 15, wherein the first light guide plate emits light toward the first electro-optical panel, and the second light guide plate emits light toward the second electro-optical panel.

17. An electro-optical device according to claim 16, further comprising:

a first light source placed on one side of the first light guide plate so as to introduce light into the first light guide plate; and a second light source placed on the other side of the second light guide plate different from the one side so as to introduce light into the second light guide plate.

18. An electro-optical device according to claim 17, wherein the first light guide plate and the second light guide plate are in direct contact with each other, or are disposed in contact with each other through an optical layer therebetween.

19. An electro-optical device according to claim 18, further comprising:

a support frame of the support member for engaging and holding the first light guide plate and the second light guide plate.

* * * * *